Oct. 3, 1950     O. F. BAUER     2,524,301
GEAR CUTTER
Filed May 24, 1947
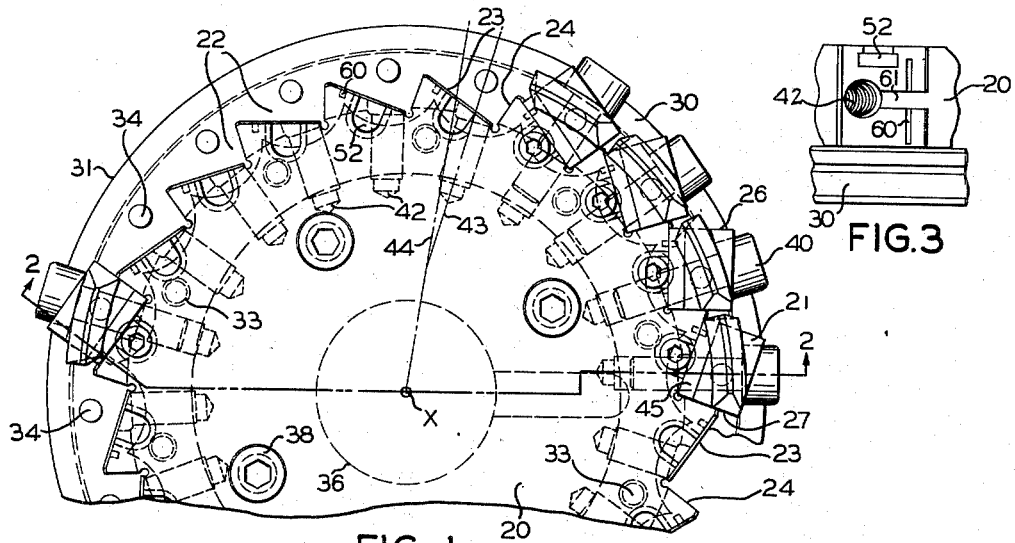
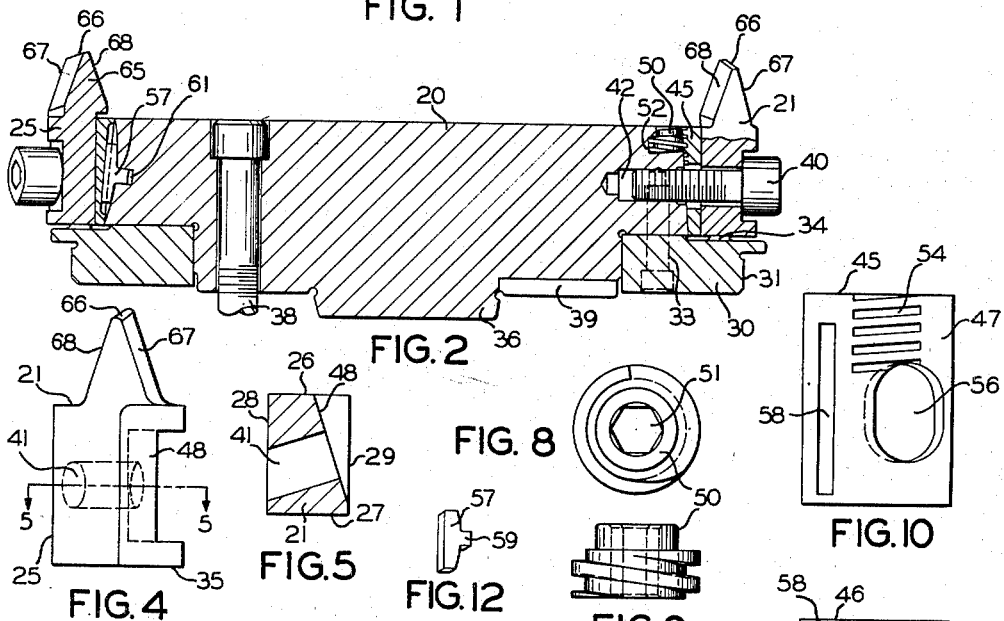
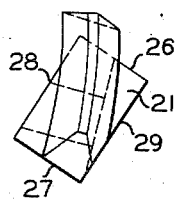
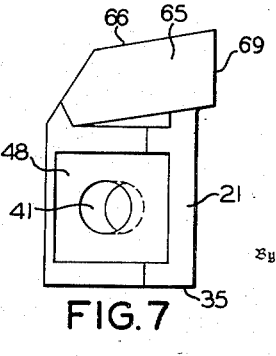
OLIVER F. BAUER
Inventor
By
Schlesinger
Attorney Patented Oct. 3, 1950

2,524,301

UNITED STATES PATENT OFFICE 2,524,301

GEAR CUTTER

Oliver F. Bauer, East Rochester, N. Y., assignor to Gleason Works, Rochester, N. Y., a corporation of New York Application May 24, 1947, Serial No. 750,214

10 Claims. (Cl. 29—105)

The present invention relates to cutting tools of the inserted blade type and particularly to face-mill gear cutters such as are employed in the cutting of spiral bevel and hypoid gears.

The blades of inserted-blade type face-mill cutters have shank portions which are secured in the cutter head, and cutting portions which project beyond one side-face of the cutter head in the general direction of the axis of the head. The several blades of a cutter have to be trued accurately relative to one another radially of the axis of the cutter for their cutting portions to track correctly and for the cutter to cut accurately.

In conventional face-mill gear cutters of the inserted-blade type, the shanks of the blades are of right tetragonal prismatic shape and have parallel plane front and rear sides. Each blade is inserted into a peripheral slot in the cutter head which has parallel plane front and rear walls. The blade shanks are made as accurately as possible to fit the blade slots, but even so difficulty is frequently experienced when inserting the last blade in a cutter head in getting this blade properly seated in its slot and properly adjusted radially with reference to the other blades; the first blades inserted in the cutter head tend to expand their own blade slots, when they are tightened up in their blade slots by their holding bolts, and they thereby narrow the slot left for the last blade. Moreover, in the conventional type face-mill cutter, if a blade is removed for any reason, the other blades tend to shift position because of the release of pressure on them by the removal of the one blade. Thus, all of the blades of the cutter have to be retrued when reassembling blades in the cutter head. While the amount, which the blades may shift, is very small, any shift is serious when a cutter has to cut to an accuracy measured in thousandths or even in ten-thousandths of an inch.

The tendency of the blades to expand the blade slots, when the holding bolts are drawn up to secure the successive blades in the head, is increased in the case of conventional face-mill gear cutters of the finishing type because the heads of such cutters are provided with axially extending holes for the adjusting screws that are employed to adjust the blades radially of the head. There has to be an adjusting screw for each blade; and the holes for these screws make the cutter head all the more liable to expand or contract under pressure.

In a conventional type inserted blade face-mill cutter, moreover, the number of blades that can be mounted in the cutter head is limited by the amount of stock which it is required be left in the cutter head for the lands between successive slots.

In the conventional cutter, also, each blade is secured in its slot by a holding bolt that threads into the cutter head in a direction perpendicular to the inside face of the slot, that is, perpendicular to the cutter axis. While each blade is made as accurately as possible to a size to fit snugly in its blade slot, necessary manufacturing and assembly tolerances make it difficult to secure a blade which will fit so well as to seat absolutely against the front, side, and rear walls of the blade slot simultaneously. As a result some of the cutting thrusts, at least initially, have to be taken by the holding bolt.

The blade slots of the conventional cutter have, moreover, as stated, parallel front and rear walls, and a side wall perpendicular to the front and rear walls. This makes it difficult to grind the blade-slots practically, for all three walls can not be ground simultaneously since wheel-wear narrows the point-width of the grinding wheel. As a result most conventional face-mill gear cutter heads are not hardened, and their blade-slots are not ground.

One object of the present invention is to provide an inserted-blade type face-mill gear cutter that for any given diameter may have a greater number of cutting blades than has heretofore been possible to provide in such a cutter.

Another object of the invention is to provide a face-mill gear cutter of the inserted-blade type in which the several blades may be held under uniform holding conditions.

A further object of the invention is to provide a face-mill gear cutter of the inserted-blade type in which any blade can be inserted or removed from the head without causing a change in the positions of the other blades.

Another object of the invention is to simplify manufacture of face-mill gear cutters of the character described and permit grinding the seats for the blades and hardening of the cutter head.

A still further object of the invention is to provide a face-mill gear cutter of the character described in which the blades can be held more rigidly and be supported better against the pressure of the cut.

Another object of the invention is to provide an inserted-blade face-mill gear cutter which can be made more accurately.

Still another object of the invention is to provide an inserted-blade type face-mill cutter for finishing gears in which the through-holes for the adjusting screws can be eliminated and a more solid head provided which will be less subject to change under the pressure of tightening the holding bolts.

A still further object of the invention is to provide a face-mill gear cutter in which the bore heretofore required for mounting the cutter on the spindle of a gear cutting machine may be eliminated and the head made even more solid and rigid.

Other objects of the invention will be apparent hereinafter from the specification and from the recital of the appended claims.

In the drawings:

Fig. 1 is a fragmentary plan view of a face-mill gear cutter made according to a preferred embodiment of this invention with some of the blades removed and with part of the base plate broken away to show the form of the blade slots;

Fig. 2 is a transverse sectional view through the cutter taken on the line 2—2 of Fig. 1;

Fig. 3 is a fragmentary elevational view of the cutter head, looking at the side of one of the notches or pockets for a cutter blade;

Fig. 4 is a perspective view of one of the cutter blades;

Fig. 5 is a section through the shank of this blade taken on the line 5—5 of Fig. 4;

Fig. 6 is a top plan view of the blade;

Fig. 7 is a side elevation of the blade;

Fig. 8 is a plan view and Fig. 9 an elevational view one of the adjusting screws for the blades;

Fig. 10 is a side elevation and Fig. 11 a plan view of one of the wedges for adjusting the radial position of the blades; and Fig. 12 is a perspective view of one of the keys for the adjusting wedges.

In a face-mill gear cutter made according to the preferred embodiment of this invention, the cutter head is provided on its periphery with the blade-receiving recesses or pockets, each of which is of V or saw-toothed shape and which has but a side wall and a rear wall. These pockets have no front walls. The side walls of the pockets extend to the periphery of the head and are inclined to the peripheral circle of the head. The rear walls are substantially perpendicular to the side walls. With the form of blade pocket employed, more blades can be mounted in a cutter head of a given diameter than in a conventional cutter, because the lands heretofore required between successive blade slots are eliminated.

For holding the blades in the cutter head, the holding bolts thread into the head in a direction inclined at other than right angles to both the side and rear walls of the pockets so that the blades are pulled against both the side and rear walls of the pocket when the bolts are tightened up. In this way, cutting thrusts are taken by the walls of the pockets rather than by the tightening bolts.

In the preferred embodiment of the present invention, the cutter heads are made without bores, and for mounting on the tool spindles of the gear cutting machines are provided on their rear faces with tapered noses which are adapted to seat in correspondingly-shaped recesses in the front faces of the cutter spindles. For adjusting the blades radially, screws are employed which seat in recesses in the cutter head. These engage in helical grooves or notches in wedge members that are interposed between each blade and the side wall of the pocket for that blade.

Referring now to the drawings by numerals of reference, 20 denotes the cutter head and 21 the cutting blades. The cutter head has its periphery formed with a plurality of notches or pockets 22 which have generally plane side walls 23 and plane rear walls 24. The rear walls 24 lie in planes parallel to the axis of the cutter head but offset therefrom. Each rear wall is substantially perpendicular to the side wall of a pocket; and the side walls are inclined to the periphery of the cutter head so that the cutter head has a generally saw-toothed peripheral conformation. The side wall of each pocket terminates at its front end approximately at the rear wall of the next preceding pocket, thereby providing the maximum number of pockets in the head.

Each of the blades 21 has a shank portion 25 which is of generally right, tetragonal prismatic shape. It has front and rear surfaces 26 and 27, that are parallel plane surfaces, an inside surface 28, which is a plane surface perpendicular to the surfaces 26 and 27, an outside surface 29, which is also a generally plane surface parallel to the surface 28 and perpendicular to the surfaces 26 and 27, and a bottom face 35, which is a plane surface perpendicular to surfaces 26, 27, 28 and 29.

The cutter head 20 is formed to a reduced diameter in the rear, axially, of the blade pockets, as is clearly shown in Fig. 2. Surrounding this portion of reduced diameter and secured to the bottom or rear face of the cutter head is a truing disc 30 which has a cylindrical peripheral surface 31 coaxial with the axis of the cutter head. This truing disc is adapted to serve the same purpose as the truing disc of the cutter disclosed in the pending application of Herbert G. Hartman, Serial No. 655,633, filed March 19, 1946, now Patent No. 2,506,082 granted May 2, 1950. The peripheral surface 31 of this truing disc is adapted to be employed, like the peripheral surface of the Hartman truing disc, for truing the cutter. The truing disc 30 is secured to the cutter head 20 by a plurality of spaced screws 33. It has a front or upper face which projects beyond the periphery of the cutter head. The projecting portion of this upper or front face is formed with circular rests or seats 34 on which the plane bottom surfaces 35 of the blades 21 are adapted to seat when the blades are mounted in the pockets 22 of the cutter head.

In the preferred embodiment, the cutter head is solid; that is, it does not have any central bore for receiving the nose of the tool spindle on which the cutter is to be used. Instead, the cutter is formed with a tapered nose portion 36 at its rear which is adapted to seat in a correspondingly tapered recess in the front of the tool spindle. Bolts 38, which pass through the cutter head and which thread into the face of the tool spindle serve to secure the cutter to the spindle. Driving engagement of the cutter and spindle is achieved through a key (not shown) that is secured to the spindle and that is adapted to engage in a key slot 39 in the cutter head.

The blades 21 are adapted to be secured in their respective pockets 22 by holding bolts 40. These pass through holes 41 in the shanks of the blades and thread into holes 42 in the cutter head. The holes 41 in the shanks of the blades extend diagonally through the shanks, being inclined rearwardly from the outside surface 29 of the inside surface 28 of the shank. The holes 42 in the cutter head are inclined at other than right angles to the sides 23 of the blade pockets.

The center line 43 of each is inclined to a line 44 radial of the axis x of the cutter head. These holes 42 are inclined rearwardly so that when the holding bolts 40 are tightened, the blades are drawn rearwardly as well as laterally into the blade pockets. Thereby, the blades are firmly seated against the rear faces 24 as well as against the sides of the blade slots. To provide room for the heads of the holding bolts, the outside surface 29 of each blade shank is slabbed off as denoted at 48.

In the case of roughing cutters, the inside surfaces 28 of the blades may be seated directly against the side walls 23 of the blade pockets. The cutter shown in the drawings is a finishing cutter. In this case, a wedge 45 is interposed between the inside surface of the shank of each blade and the side wall 23 of the blade pocket. These wedges have outside plane surfaces 46 which contact the inside surfaces 28 of the blade shanks and, like the surfaces 28, are plane surfaces parallel to the axis of the cutter head. The inside surfaces 47 of the wedges are, also, generally plane, but are inclined to the surfaces 46, each wedge being of less thickness at its bottom than at its top. The surfaces 47 of the wedges are adapted to seat against the side walls 23 of the blade pockets of a finishing cutter head; and the sides 23 of the blade pockets are correspondingly inclined to the axis of the cutter head, the bottom of each side wall 23 being at a greater distance from the axis of the cutter head than the top of that side wall.

The wedges 45 are adapted to be adjusted axially of the cutter head in order to adjust the radial positions of the blades 21. For effecting this adjustment, adjusting screws 50 are provided. These screws are hollow and may have a hexagonal bore 51 to receive a suitable wrench. The screws 50 do not thread into the cutter head 20 but are simply seated in peripheral recesses 52 (Fig. 3) formed in the cutter head. Each screw is adapted to mesh with a segmental internal thread 54 formed on the inside face of the cooperating wedge 45. The holding bolts 40 pass through elongated slots 56 formed in the wedges. The side walls of each slot 56 are inclined to the sides of the wedge in accordance with the inclination of the holding bolt to a line radial of the cutter axis. Each wedge 45 is guided in its axial adjusting movement by a key 57 which engages in an elongated groove 58 in the wedge. Each key 57 seats in a recess 60 (Fig. 3) formed in the side wall 23 of the corresponding blade pocket; and each key 57 has a tongue 59 that seats in a groove 61 formed in the side wall 23 at right angles to slot 60.

The cutting portions 65 of the blades project beyond the adjacent front face of the cutter head 20 in the usual manner. The tip surfaces 66 and the side surfaces 67 and 68 of the cutting portions are relieved back of the front face 69 to provide cutting clearance. The front face 69 of the cutting portion may be sharpened in the usual or any suitable manner.

The cutter shown in the drawings is intended for use in the conventional intermittent indexing process of cutting spiral bevel and hypoid gears. Because the blades are arranged non-radially in the cutter head, the cutting portions of the blades extend diagonally from front to rear with reference to the blade shanks. The blades are mounted, however, in their pockets so that the longitudinal center line of the cutting portion of each blade lies in a circle concentric with the axis of the cutter. The invention is applicable, however, to cutters for use in the continuous indexing method.

In the drawings, alternate blades are shown sharpened with opposite side rake to provide side cutting edges at opposite sides of alternate blades. The invention is applicable, however, to all forms of face-mill gear cutters. Thus it may be applied not only to cutters whose blades are sharpened so that alternate blades have opposite side cutting edges, but also to cutters whose blades have cutting edges all at the same side, to cutters, all of whose blades have cutting edges at both sides, to three-blade type roughing cutters such as disclosed in the Stewart et al. Patent No. 2,268,326, granted December 30, 1941, etc.

It will further be understood that while the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter comprising a rotary head having a generally saw-tooth shaped periphery providing a plurality of peripherally arranged blade-receiving pockets, each of which is formed by a side wall and a rear wall, the side wall of each pocket having its front end terminating at the periphery of the head approximately at the rear wall of the next preceding pocket without there being any substantial land between the side wall of one pocket and the rear wall of the next preceding pocket, and blades secured in said pockets with their cutting portions projecting beyond one side face of the head in the general direction of the axis of the head.

2. A face-mill gear cutter comprising a rotary head having a generally saw-tooth shaped periphery providing a plurality of peripherally arranged blade-receiving pockets, each of which is formed by a side wall and a rear wall, the side wall of each pocket terminating at its front end at the periphery of the head approximately at the rear wall of the next preceding pocket without there being any substantial land between the side wall of one pocket and the rear wall of the next preceding pocket, blades mounted in said pockets with their cutting portions projecting beyond one side face of the head in the general direction of the axis of the head, and bolts for securing said blades in said pockets, each bolt passing through its blade and threading into the head and extending in a direction inclined rearwardly with reference to both the side and rear walls of its pocket.

3. A face-mill gear cutter comprising a rotary head having a generally saw-tooth shaped periphery providing a plurality of peripherally arranged blade-receiving pockets, a blade secured in each pocket, each blade having a shank portion, which is mounted in its pocket, and a cutting portion, which projects beyond one side face of the head in the general direction of the axis of the head, a wedge interposed between each blade and its pocket and adjustable axially of the head to effect radial adjustment of the blade, a bolt for securing each blade in its pocket, each said bolt passing through a slot in the associated wedge and threading into the head in a direction inclined rearwardly with reference to both the side and rear walls of the associated pocket, a plurality of hollow-headed screws rotatably mounted in recesses in the head and each having threaded engagement with one of said wedges to adjust said wedge axially of the head, and cooperating means on the head and wedge for guiding each said wedge in its adjustment.

4. A face-mill gear cutter comprising a rotary head having a generally saw-tooth shaped peripheral blade-receiving pockets, the rear and side walls of each pocket being inclined to the periphery of the head and extending to the periphery of the head, a blade having a shank portion, which is rectangular in cross-section, mounted in each pocket and a cutting portion, which projects beyond one side face of the head in the general direction of the axis of the head, said cutting portion being curved from front to rear along an arc which is concentric with the axis of the cutter, but extending diagonally of the shank portion from front to rear thereof, and a bolt for securing the blade in its pocket, said bolt passing through the blade and threading into the head and extending in a direction inclined rearwardly to both the side and rear walls of the pocket.

5. A rotary head for face-mill gear cutters having a generally saw-tooth shaped periphery providing a plurality of peripheral blade-receiving pockets, each of which has a single side wall and a rear wall, the side walls terminating at the periphery of the head, and the rear walls, at least, being plane surfaces parallel to the axis of the head.

6. A rotary head for face-mill gear cutters having a generally saw-tooth shaped periphery providing a plurality of peripheral blade-receiving pockets, each of which has a single side wall and a rear wall, the side wall of each pocket terminating at its forward end of the periphery of the head approximately at the rear wall of the next preceding pocket without there being any substantial land between the side wall of one pocket and the rear wall of the next preceding pocket, and the rear walls, at least, extending in the general direction of the axis of the head.

7. A face-mill gear cutter blade having a shank portion which is adapted to be inserted in a rotary head, and a cutting portion which is integral with the shank and formed at one end thereof, said cutting portion having a front face and being relieved back of its front face, said shank portion being of generally rectangular shape in cross-section and having parallel front and rear faces and parallel inner and outer faces and having a hole extending therethrough for a securing bolt, said hole being inclined rearwardly from the outer to the inner face of the shank.

8. A face-mill gear cutter blade having a shank portion and a cutting portion, said shank portion being adapted to be inserted in a rotary head and being of generally right, tetragonal prismatic shape and having front, rear, inside and outside surfaces, and said cutting portion being integral with the shank and formed at one end thereof, said cutting portion being curved along the arc of a circle from front to rear and extending diagonally across the said end of the shank from one corner thereof to the other and being relieved on its side and tip surfaces back of its front face, and said shank portion having a hole extending therethrough for a securing bolt, said hole being inclined rearwardly from the outside to the inside of the shank.

9. A face-mill gear cutter comprising a rotary head having a generally saw-tooth shaped periphery providing a plurality of peripheral blade-receiving pockets, each said pocket having a side wall and a rear wall, both of which are plane surfaces extending in the general direction of the axis of the head, the rear wall of each pocket being in a plane parallel to but offset from the axis of the head and the side wall of each pocket being perpendicular to the rear wall, and a blade mounted in each pocket, each blade having a shank which is rectangular in cross-section and which has inside and rear walls which are plane surfaces perpendicular to one another, said blade being mounted in its pocket with its cutting portion projecting beyond one side face of the head in the general direction of the axis of the head, and a bolt passing through each blade and threading into the head in a direction inclined to both the side and rear walls of the associated pocket and inclined to a line radial of the axis of the head.

10. A face-mill gear cutter comprising a rotary head having a generally saw-tooth shaped periphery providing a plurality of peripheral pockets, each of which has plane side and rear walls, the rear wall of each pocket being offset from the axis of the head and the side wall of each pocket being perpendicular to the rear wall, each side wall terminating at the periphery of the head and both the rear and side walls extending in the general direction of the axis of the head, and a blade mounted in each pocket, each blade having a shank portion, which extends in the general direction of the axis of the head and which is secured in the pocket, and a cutting portion, which projects beyond one side face of the head in the general direction of the axis of the head.

OLIVER F. BAUER.

REFERENCES CITED

The following references are of record in the file of this patent:

UNITED STATES PATENTS

| Number | Name | Date |
|---|---|---|
| 1,249,378 | Gleason et al. | Dec. 11, 1917 |
| 1,820,415 | Wildhaber | Aug. 25, 1931 |
| 1,898,051 | Head | Feb. 21, 1933 |
| 1,914,411 | Earl | June 30, 1933 |
| 2,024,494 | Wildhaber | Dec. 17, 1935 |
| 2,125,943 | McMullen et al. | Aug. 9, 1938 |
| 2,415,136 | Jerome | Feb. 4, 1947 |